(12) United States Patent
Ali et al.

(10) Patent No.: US 9,939,994 B2
(45) Date of Patent: Apr. 10, 2018

(54) TRACKING AND MANAGING ITEMS IN A COLLABORATIVE EXCHANGE

(71) Applicant: International Business Machines Corporation, Armonk, NY (US)

(72) Inventors: Mustansir Ali, Hornsby (AU); Tuan Dang, Raleigh, NC (US); Kent Hayes, Chapel Hill, NC (US); Robert T. Uthe, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 368 days.

(21) Appl. No.: 14/865,129

(22) Filed: Sep. 25, 2015

(65) Prior Publication Data
US 2017/0090687 A1     Mar. 30, 2017

(51) Int. Cl.
*G06F 3/00*     (2006.01)
*G06F 3/0482*   (2013.01)

(52) U.S. Cl.
CPC ................. *G06F 3/0482* (2013.01)

(58) Field of Classification Search
CPC ........................................ G06F 3/0482
USPC ........................................ 715/751
See application file for complete search history.

(56) References Cited

U.S. PATENT DOCUMENTS

| | | | |
|---|---|---|---|
| 8,209,611 B2* | 6/2012 | Yoshimine | G11B 27/034 715/723 |
| 8,751,559 B2 | 6/2014 | Richardson et al. | |
| 2002/0087520 A1 | 7/2002 | Meyers | |
| 2003/0041077 A1* | 2/2003 | Davis | G06F 17/2247 715/205 |
| 2004/0095378 A1 | 5/2004 | Vigue et al. | |
| 2007/0024594 A1* | 2/2007 | Sakata | G06F 3/0488 345/173 |
| 2014/0317502 A1* | 10/2014 | Brown | G06F 9/4446 715/706 |
| 2015/0160799 A1* | 6/2015 | Won | G06F 3/0482 715/739 |
| 2016/0378718 A1* | 12/2016 | Jarroush | G06F 17/211 715/229 |

(Continued)

OTHER PUBLICATIONS

Chakklamattam J. Paul, et al.,"Identifying Changes in Multiple Resources Related to a Problem," U.S. Appl. No. 14/865,103, filed Sep. 25, 2015.

(Continued)

*Primary Examiner* — William Titcomb
(74) *Attorney, Agent, or Firm* — Cantor Colburn LLP; Richard Wilhelm (57) ABSTRACT

According to embodiments of the present invention, methods, systems, and computer program products are provided for flagging, tracking, and managing collaborative content to facilitate addressing flagged items, including providing a user interface configured to receive a flag from a user for portions of content in a collaborative effort system, the content comprising one or more log elements and the flag indicating a flagged user, applying the flag to an indicated content to form a flagged content responsive to an input by the user, displaying the flagged content such that the flagged content is visible to the flagged user, receiving an entry by the flagged user indicating the flagged content, and removing the flag from the indicated content.

20 Claims, 4 Drawing Sheets

(56) References Cited

U.S. PATENT DOCUMENTS

2016/0378721 A1* 12/2016 Jarroush ............... G06F 3/0481
715/765
2016/0380990 A1* 12/2016 Jarroush ................ H04L 63/08
726/5

OTHER PUBLICATIONS

List of IBM Patents or Patent applications Treated as Related; filed Sep. 25, 2015, pp. 1-2.
Richard A. King, et al.,"Annotating Collaborative Content to Facilitate Mining Key Content as a Runbook ," U.S. Appl. No. 114/865,111, filed Sep. 25, 2015.
Robert T. Uthe,"Enabling a Multi-Dimensional Collaborative Effort System", U.S. Appl. No. 14/865,148, filed Sep. 25, 2015.

* cited by examiner

Could there be a database issue?
  Dave: I'm looking at DB2 right now
  Kay: From the outside it looks like requests are not getting processed.
  Dave: Transactions are ok, ?Kathy can you check the network?
...... <some time later> ......
  Kathy: I'm seeing an odd port issue

FIG. 3B

Could there be a database issue?
  Dave: I'm looking at DB2 right now
  Kay: From the outside it looks like requests are not getting processed.
  Dave: (?Q1) Transactions are ok, ?Kathy can you check the network to see if the network has enough bandwidth available?
...... <some time later> ......
  Kathy: @Q2 I'm seeing something odd as well, that port seems OK but the secondary port 50005 is blocked now. I need to dig more.
  Kathy: @Q1 The network is at <10% utilization

FIG. 3C

Could there be a database issue?
  Dave: I'm looking at DB2 right now
  Kay: From the outside it looks like requests are not getting processed.
  Dave: Transactions are ok, ?Kathy can you check the network to see if the network has enough bandwidth available? [Answer]
  Kay: I'm seeing something else I don't understand, ?Kathy is port 50005 opened up for access? [Answer]

FIG. 4

TRACKING AND MANAGING ITEMS IN A COLLABORATIVE EXCHANGE

BACKGROUND

The present invention relates to collaborative exchanges, and more specifically, to methods and systems to track and manage items in a collaborative exchange.

Within systems management, problems may arise that may require collaborative efforts to resolve. When a problem arises, companies may quickly convene a "virtual war room" or other type of collaborative effort. One key piece of the problem solving may be a conference call. Another important aspect to the problem solving may be a group chat. The group chat is a vital collaboration tool, yet group chats may not be configured to handle intense and time sensitive discussions. More specifically, as multiple people discuss items at the same time it may become easy for items, i.e., questions, direct comments, etc., to slip through the cracks. For example, a question presented to a particular person may have helped resolve a problem significantly faster, but if that person misses the question when it is originally posed, the question may scroll off the screen in the group chat as others continue to discuss the problem and potential solutions. As such, it may be difficult to track and manage specific items within the collaborative discussion.

SUMMARY

According to embodiments of the present invention, methods, systems, and computer program products are provided for flagging, tracking, and managing collaborative content to facilitate addressing flagged items, including providing a user interface configured to receive a flag from a user for portions of content in a collaborative effort system, the content comprising one or more log elements and the flag indicating a flagged user, applying the flag to an indicated content to form a flagged content responsive to an input by the user, displaying the flagged content such that the flagged content is visible to the flagged user, receiving an entry by the flagged user indicating the flagged content, and removing the flag from the indicated content.

DETAILED DESCRIPTION

Various embodiments described herein provide systems and processes for tracking and managing the content of a collaborative effort or system, such as a war room, chat room, dialogue program, social network, etc. Further, various embodiments described herein provide enabling responding to items within the content that may be submitted in the part. Further, various embodiments described herein provide systems and processes for managing data in the collaborative effort or system such that the data may be sorted, processed, manipulated, handled, etc. during and/or after a specific item is entered into the collaborative system.

As problems arise in various systems, depending on the seriousness and/or complexity of the problem, the problem may be routed to one or more subject matter experts (SME). As applications and systems have increased in complexity, multiple SMEs may participate to collectively and collaboratively figure out where a given problem lies and how to fix it. That is, multiple SMEs (or other persons) may perform a collaborative effort to understand a given problem, identify where the problem exists, and find a resolution to the problem. In high-pressure problems it is common to have upward of twenty-five or more people collaborating to solve a single problem.

One option to enable a collaborative effort is the use of group chat and/or networking, which may be the basis for group collaboration in a "virtual war room" capability. As used herein, the term "collaborative effort system" will be used to refer to a group chat, virtual war room, instant messaging, short message services, blog, website, online community, news feed, email, wiki, etc., or other social or collaborative application, process, and/or system. The collaborative effort system may contain the dialog of interactions back and forth between several SMEs and other persons as they chase leads and ultimately uncover key symptoms of the problem. The collaborative effort system may also include the discussion that the SMEs and other persons have when they find or identify the problem and the actions they took in response to the problem, whether the actions were successful or not. That is, the collaborative effort system will thus contain all of the information uncovered through the problem-resolution cycle that is performed by the SMEs. This information may include hundreds or thousands of messages spanning not only the ultimate resolution to the problem, but may include all of the details about the paths and options investigated and subsequently cleared of being a cause of the problem and/or potential solutions that were not completed or sufficient to solve the problem adequately.

During the active discussion in the collaborative effort system, users may each be able to post comments, pictures, questions, etc. as is normal. Moreover, during the discussion, the users may post questions to each other using a flagging approach. That is, a specific question may be flagged for a specific user that is part of the discussion and participating in the collaborative effort system. For example, in one non-limiting example, a user may post: "Transactions are ok, ?User55 can you check the network?". In this example, a first user, e.g., User54 may pose a question to another user, e.g., User55, and this item can be flagged for User55. This may be an ad-hoc convention used to help get a user's attention in the chat dialog. However, if the specified user is not watching/reading the dialog at that moment the question is posed, the item may get scrolled off as other discussion happens. When trying to solve a problem in a timely manner it is critical to help track and enhance the collaboration between the participants of the collaborative effort system.

In accordance with some embodiments provided herein, a process to track and manage items flagged for a particular user or group of users within a collaborative effort system is provided. The relevant items may include questions and/or actions directed to a particular user or group of users. Hereinafter the relevant items will be referred to as "flagged item."

Figure 1:
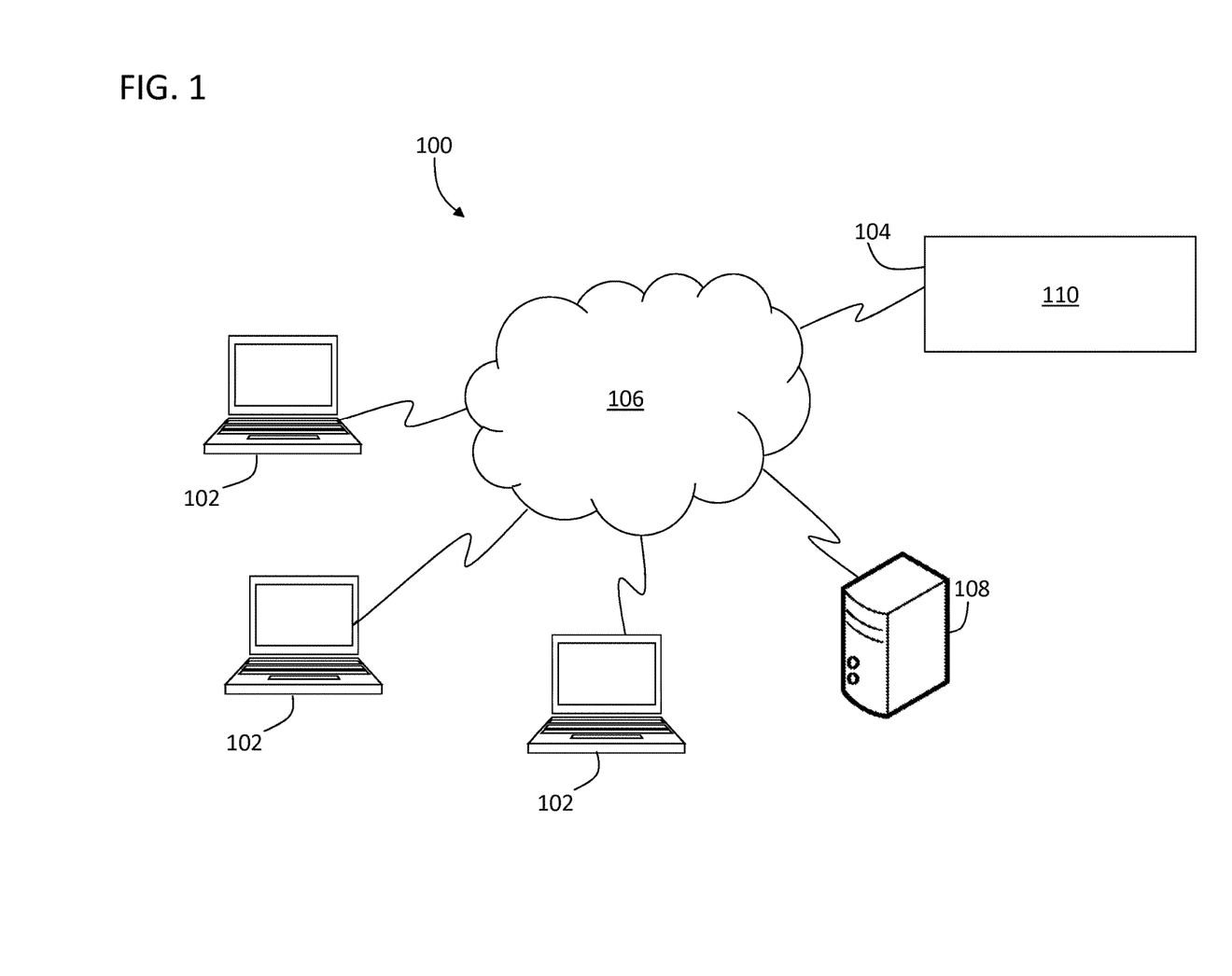
FIG. 1 depicts a block diagram of a system for enabling collaborative efforts to generate collaborative content in accordance with an embodiment.

Referring to FIG. 1, a block diagram of a system 100 for enabling a collaborative effort system and tracking and managing portions of a discussion in accordance with an embodiment is shown. The system 100 includes a chat or discussion application, hereinafter collaborative effort system 110, for performing the processing described herein that is executed by one or more computer programs located on a host system 104 and/or a user system(s) 102.

The system 100 depicted in FIG. 1 includes one or more user systems 102 through which users, e.g., SMEs and other persons, at one or more geographic locations may contact the host system 104 to initiate programs and/or participate in the collaborative effort system 110. The user systems 102 are coupled to the host system 104 via a network 106. Each user system 102 may be implemented using a general-purpose computer executing a computer program for carrying out the processes described herein. The user systems 102 may be user devices such as personal computers (e.g., a laptop, a tablet computer, a cellular telephone, etc.) or host attached terminals. If the user systems 102 are personal computers, in some embodiments, the processing described herein may be shared by a user system 102 and the host system 104. The user systems 102 may also include game consoles, network management devices, and field programmable gate arrays. In addition, multiple user systems 102 and/or host systems 104 may be concurrently operating to aggregate web interactions for personalized usage.

The network 106 may be any type of known network including, but not limited to, a wide area network (WAN), a local area network (LAN), a global network (e.g. Internet), a virtual private network (VPN), a cloud network, and an intranet. The network 106 may be implemented using a wireless network or any kind of physical network implementation known in the art. A user system 102 may be coupled to the host system through multiple networks 106 (e.g., cellular and Internet) so that not all user systems 102 are coupled to the host system 104 through the same network 106. One or more of the user systems 102 and the host system 104 may be connected to the network 106 in a wireless fashion. In one non-limiting embodiment, the network is the Internet and one or more user systems 102 execute a user interface application (e.g. a web browser) to contact the host system 104 through the network 106. In another non-limiting example embodiment, the user system 102 is connected directly (i.e., not through the network 106) to the host system 104. In a further non-limiting embodiment, the host system 104 is connected directly to or contains a storage device 108.

The storage device 108 includes data relating to the collaborative effort system 110 and/or data relating to a problem to be solved. In some embodiments, the storage device 108 may be implemented using a variety of devices for storing electronic information. In an example embodiment, data stored in the storage device 108 includes, but is not limited to, one or more search data and search history databases, and other data utilized by embodiments described herein. It is understood that the storage device 108 may be implemented using memory contained in the host system 104 or that it may be a separate physical device. The storage device 108 may be logically addressable as a consolidated data source across a distributed environment that includes the network 106. Information stored in the storage device 108 may be retrieved and manipulated via the host system 104 and/or via a user system 102.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access, e.g., permitting only designated SMEs and/or other authorized persons to access the collaborative effort system 110. For instance, an administrator may have access to the entire system and have authority to modify portions of the system and/or permissions thereto. A firewall may be implemented using conventional hardware and/or software as is known in the art.

The host system 104 may also operate as an application server. The host system 104, in such embodiments, may execute one or more computer programs, including the collaborative effort system 110, to provide aspects of embodiments as described herein. Processing may be shared by the user system 102 and the host system 104 by providing an application to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

During a collaborative effort, one or more users, e.g., SMEs and other persons, may use a user system 102 to communicate through the network 106 and participate in a discussion on the host system 104 employing the collaborative effort system 110.

Figure 2:
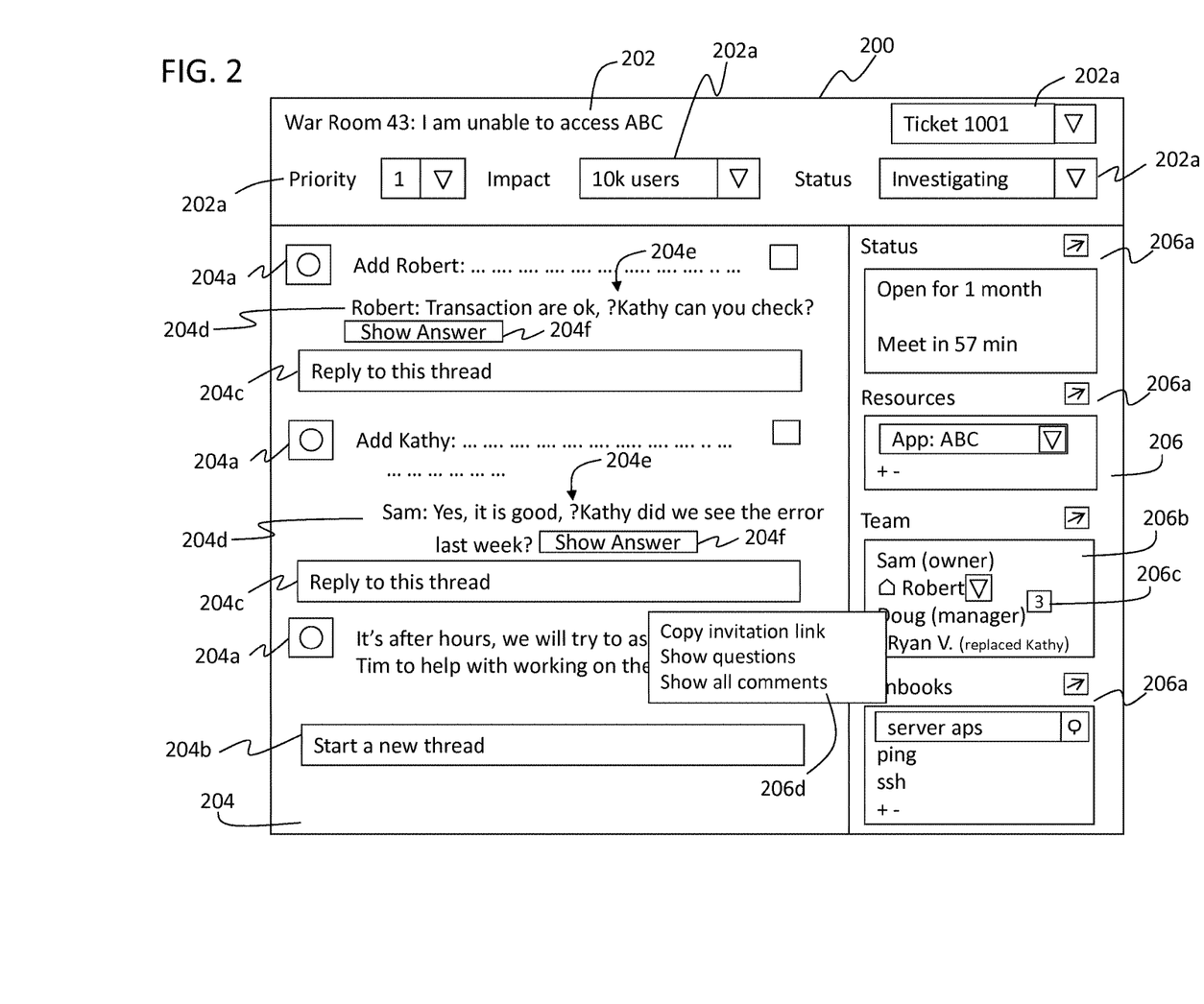
FIG. 2 depicts an illustrative view of a user interface of a collaborative application incorporating features in accordance with an embodiment.

Turning to FIG. 2, a non-limiting example of a collaborative effort system user interface 200 incorporating an example embodiment of the present disclosure is shown. The user interface 200 may be a visual representation of the collaborative effort system 110 presented on a user device 102 as executed by a host system 104. User interface 200 may include one or more windows configured to provide functionality and/or information therein. For example, a first window 202 may provide general information about the particular collaborative effort system, a second window 204 may provide information and contain content regarding the process to reach a solution to the problem (i.e., a discussion), and a third window 206 may provide additional information and/or options within the user interface 200, e.g., a list of all people interacting in the collaborative system. Each of these example potential windows of the non-limiting embodiment will now be described.

The first window 202 may provide general information about the particular collaborative effort system. As shown, first window 202 includes a war room number ("war room 43") and a description of the general problem to be solved within war room 43: "I am unable to access ABC." ABC may be a program, application, server, website, and/or other virtual or physical element that may be subject to one or more problems. Also included in the first window 202 may be one or more modifiable fields 202a that provide additional general information related to the problem, including, but not limited to priority, status, impact, etc. As shown, FIG. 2 indicates a matter number "ticket 1001." Additionally, a priority field is present, and as shown is indicated as "Priority 1." Impact information may also be provided, indicating the impact of the identified problem, and here is shown as 10,000 users are impacted. Finally, as shown, first window 202 may include a status field that indicates the status of the progress on the problem, and is shown as "investigating." Those of skill in the art will appreciate that the first window 202 may include other fields, information, etc. and/or combinations thereof.

The second window 204 may provide information and contain content regarding the process to reach a solution to the problem. That is, the second window 204 may be a chat window, discussion, or log of the process including the content of the collaborative effort submitted by users of the collaborative effort system. The content may be represented by one or more log elements 204a that are located within the second window 204. The log elements 204a may be threads, comments, replies, entries provided by users, pictures, URL links, etc., hereinafter "content." For example, each log element 204a may be a thread that addresses one sub-problem, a comment directed to a specific user, thoughts and conversations, etc., or combinations thereof. Alternatively, or in combination, log elements 204a may be each entry within the collaborative effort system within the second window 204. Each log element 204a may be an entry in the collaborative effort system in interface 200 that has already been submitted. The log elements 204a thus form the content of the collaborative effort system.

New log elements 204a may be created by a user interacting with an entry element 204b. Entry element 204b may be configured to allow users to type information into the second window 204, such as provide a comment, add a new thread and comments therein, and/or pose questions. The entry element 204b is how a user may generate a new log element 204a. Similarly, entry element 204c is how a user may generate a reply within a given thread and create a new log element 204d. Both of these non-limiting interactions thus expand the content within the collaborative effort system. As the entry element 204b and 204c is used to create new content, the log elements 204a and 204d that are already within the second window 204 may scroll upward and out of the window 204.

In accordance with embodiments described herein, each log element 204a may be entered with an associated flagging element 204e. The flagging element 204e may be an icon, text-character, and/or interactive element or feature that may enable a user to flag the associated log element 204a, or a portion thereof, with a designated flag. In some embodiments, the flagging element 204c may allow a user to indicate to another user that the particular flagged log element 204a contains content directed to them.

In accordance with some embodiments, various log elements 204a may be flagged with one or more flagging elements 204c, such that a log element 204a may have multiple flagging elements 204d associated therewith. Further, as will be appreciated by those of skill in the art, a flagging element may be configured to be addressed to a single user or a group of users. For example, as shown in FIG. 2, the flagging elements 204c are indicated as "?Kathy" and are followed by a question. Optionally, upon typing the "?" character, the system may display the list of users using the collaborative effort system and allow selection of one or more users to direct the question to. The first flagged element asks if Kathy can check something, and the second one asks Kathy if she saw the error previously, e.g., "last week." In other examples, the "?" character may be followed by a unit name, a location name, a division, a technology, or other word that may be used to indicate a particular group of people. For example, if a collaborative effort system includes a group of individuals that are specialists regarding server hardware, a flag "?server" may be used and flagged for all users of that group.

The third window 206 may provide additional information and/or options within the user interface 200. For example, as shown, the third window 206 may include supporting elements 206a. One supporting element 206a may be a status element that indicates the duration of the problem, e.g., when the problem was identified, and may also include milestone or event timers such as indicators when meetings or calls may be required of the users of the collaborative effort system. Supporting elements 206a may also include links or other methods of retrieving and/or accessing information, programs, etc. that are outside of the interface 200 and/or outside of the collaborative effort system. For example, a supporting element 206a may provide direct access for a user to access operational or ownership details of an application shown here as "App: ABC." Supporting elements 206a may also include a listing of the users (list 206b), e.g., the SMEs and other persons involved with the project/problem, and further may enable direct contact between one or more specific users. For example, a supporting element 206a may enable a direct messaging service to users of the collaborative effort system. Other user-specific information may be provided within the supporting elements 206a, such as user position, user access, company affiliation, etc. Further, links to materials that are associated with the problem and/or associated with systems, elements, etc. associated with the program or other systems that includes the problem may be provided in supporting elements 206a.

As noted, one of the supporting elements 206a in the third window 206 may be the list 206b of the participants and/or groups participating in the collaborative effort system. As log elements 204a and 204d are flagged with flagging elements 204c, a notification 206c of the specific flagged person or group may appear in the list 206b. The notification 206c may enable a user of the collaborative effort system to see how many pending items are flagged for a person's/group's review and follow-up.

A user may then select the person or group name from the list 206b and be presented with a menu 206d associated with that person or group. For example, the menu 206d may include options such as "copy invitation link," "show all questions," and "show all comments." The option for "show all comments" would filter the collaborative exchange in the second window 204 to only those log entries 204a, 204d created by that user or group, or flagged elements 204e directed at that user or group. Further, selecting "show all questions" may filter the collaborative exchange content shown in the second window 204 to only those log entries 204a, 204d that have flagged elements 204e indicating the particular user (person or group). Those of skill in the art will appreciate that the options provided in menu 206b may be configured to depend on the flagging, as described above. For example, an option in the menu 206d may be "show all answers" which would then filter the display to show all answers provided to questions, and may show all questions and their associated answers.

Although a single configuration of a user interface 200 of a collaborative effort system is shown herein, those of skill in the art will appreciate that the user interface 200 may take any number of formats and/or configurations. For example, in some embodiments, the user interface 200 may comprise a single window with multiple aspects thereto and/or all of the above describe capabilities may be configured within a single window or application user interface. In other embodiments, each window may be a separate feature of the collaborative effort system. Thus, the illustration of FIG. 2 is not intended to be limiting but rather is provided for illustrative and discussion purposes.

A non-limiting example will now be provided. As comments are directed towards individuals with a flag such as '?<name>', the collaborative effort system will consider that an outstanding question. In this manner a couple of people could direct questions at Kathy while she was on lunch break, where the system will monitor the dialog to see that Kathy has not responded yet. In the group chat where Kathy is listed as a participant (e.g., on list 206*b*), the number of outstanding questions she has could be displayed with a numeric badge (e.g., notification 206*c*). This will give her and everyone else an immediate visual clue she has outstanding questions. A manager could be monitoring the discussion, and may either seek her out if she doesn't respond in a reasonable amount of time or may find a suitable replacement that can. When Kathy returns to the collaborative effort system she can see the number of outstanding questions for her (e.g., notification 206*c*). She could then use an action to filter the discussion down to the questions directed at her (e.g., menu 206*d*), or have a "next question" type of action that allows her to step question to question in the chat.

In the above example, if Kathy selects "show questions" from the menu 206*d*, the second window 204 may show a filtered version of the discussion. That is, when the option is selected, the second window may only display log elements in which Kathy is flagged. She will now be able to address all items that have been flagged for her attention. Alternatively, as noted, a "next question" interface may be presented such that a single question or item is presented to Kathy, and she can address it, and then select "next" to cycle through all of the log elements 204*a*, 204*d* that contain flags 204*e* for her.

Figure 3A:
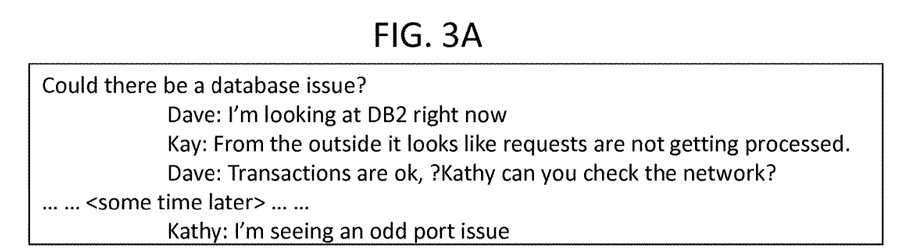
FIG. 3A depicts an illustrative schematic of how interactions in a collaborative exchange can be improved to enable tracking and closure of items of interest.
Figure 3B:
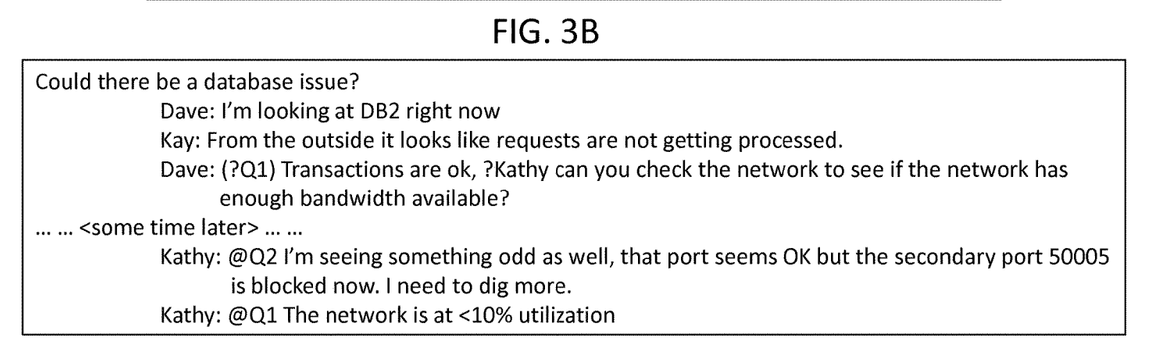
FIG. 3B depicts an alternative illustrative schematic of how interactions in a collaborative exchange can be improved to enable tracking and closure of items of interest.
Figure 3C:
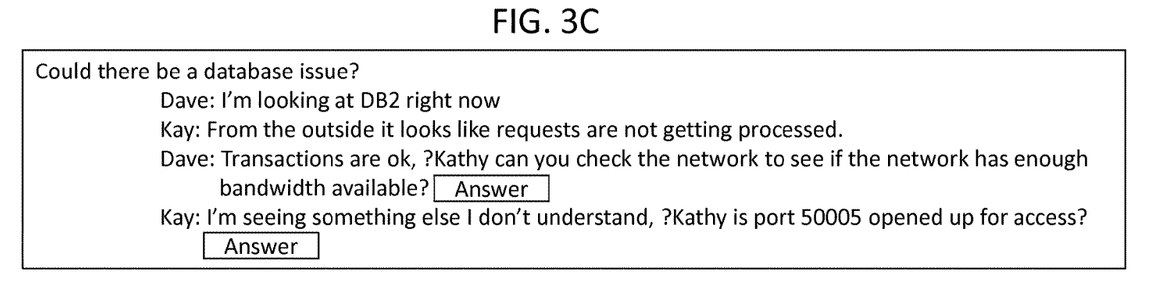
FIG. 3C depicts an alternative illustrative views of how interactions in a collaborative exchange can be improved to enable tracking and closure of items of interest.

Examples of replying to flagged items are shown in FIGS. 3A-3C, which may be implemented by various embodiments disclosed herein. For example, as shown in FIG. 3A, if the user has only one question outstanding, i.e., one flagged item, the user may simply provide a comment in the same discussion thread. Such single response may be sufficient, even if some time has passed, as indicated in FIG. 3A.

However, FIG. 3B provides an illustration of a user having multiple flagged items within the collaborative effort system. For example, as shown, if Kathy has several questions queued up (e.g., @Q1, @Q2) a simple response (e.g., as shown in FIG. 3A) may not be easily associated to a particular question or other flagged item being answered or addressed. Managing multiple flagged items may be addressed in a number of ways. For example, the collaborative effort system may be configured to automatically prepend a question with a flag that Kathy can use later when responding to that question. Such a configuration/system has the advantage of being very keyboard friendly. In the example shown in FIG. 3B, flags "@Q1" and "@Q2" are added by the system automatically, and Kathy may reply to each flag appropriately, as shown.

FIG. 3C provides an alternative configuration, where the collaborative exchange in the second window 204 may display an "Answer" button on each flagged item. The user could then click on the flagged item the user wants to reply to and then provide response text directly to the flagged item. Although not depicted in the drawings, after a question has been answered, the "Answer" button could change to a "Show Answer" button, e.g., button 204*f* shown in FIG. 2. Upon selection, the corresponding answer will be displayed to the user. In such embodiments, this may save a step of scrolling through a large amount of content to find a desired entry, and further enables a user to find and read the specific answer provided to a specific question.

Figure 4:
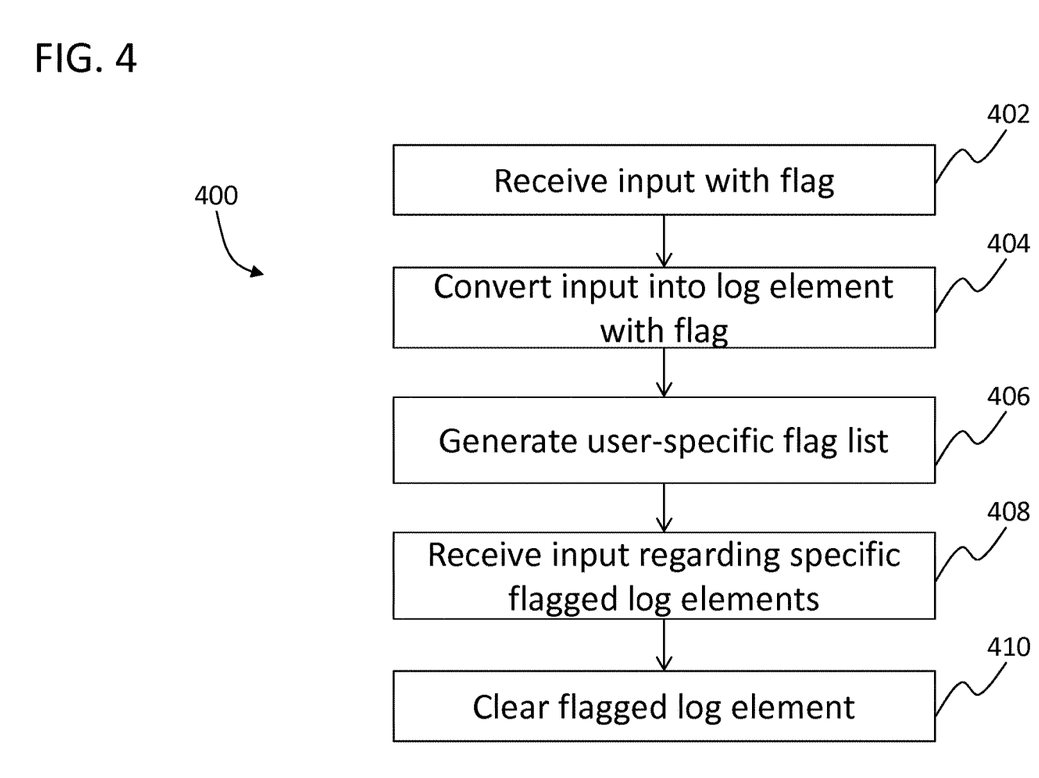
FIG. 4 depicts a process flow for defining and closing trackable items in accordance with an embodiment.

Turning now to FIG. 4, a process flow for managing and tracking flagged items in accordance with an embodiment is shown. Process flow 400 may be similar to that described above, and may be implemented on a host system and/or a user system. Process flow 400 may represent the operation of a collaborative effort system that is used by one or more users to solve an identified problem, but may also be used in any group discussion format, system, program, application, etc.

A collaborative effort system may receive user input having a flag associated with it, as shown at block 402. The user input may be received from one or more users that are accessing and/or interacting with the collaborative effort system. The input may be converted into a log element, as shown at block 404. The flagged log element may be retained by a memory and appropriate characteristics may be associated therewith. For example, the log element may be saved with a time stamp, information regarding the user submitting the content of the log element, and/or other desired and/or predetermined information. Further, the flag may indicate additional information, such as an indicator of the target user and/or group that is intended to address the flagged item. With this additional information, the log element may be displayed in a discussion thread, e.g., in a window, with the flag colored, or otherwise configured to be prominently displayed. As will be appreciated by those of skill in the art, the flag and/or the flagged log element may be saved with appropriate metadata.

The collaborative effort system may then generate a list of items that are flagged for a specific user or user group, as shown at block 406. For example, each of the flagged items of a specific user or user group may be retained in a portion of a memory and organized and managed such that a user or member of a user group may visually see all items that are flagged for that user or user group. A user may then provide input or replies to the specific flagged log elements, as shown at block 408. The input/reply may be directly associated with the original flagged item so that the user that posted the original flagged item may be able to easily determine that the item has been addressed by the appropriate person. The flag may then be cleared for the particular log element, as shown at block 410. Further, during the clearing of the flag at block 410, the received input at block 408 may be associated with a particular flagged log element received at block 402. As such, as flagged items are addressed, the list of flagged items may be updated in a real-time basis so that a user or user group may be able to determine how many items are outstanding, i.e., to be addressed.

Those of skill in the art will appreciate that the process flow 400 may include additional and/or alternative features. For example, in some embodiments, a timer or clock may be associated with each flagged item. If a predetermined time passes prior to the flagged item being addressed by the specified user or user group, the collaborative effort system may be configured to re-display the flagged log element, text the user, send an email to the user, display a pop-up window with the pending flagged item, or other notification method or process may be used, depending on the configuration of the collaborative effort system. In some such embodiments, if a response is made by the method of notification (e.g., by email, text, etc.) then the response may be submitted back into the collaborative effort system and displayed in the group chat.

Furthermore, in some embodiments, a given flagged item or log element may be transferred or reassigned. For example, a "reassign" button or option may be presented with a specific flagged item, and the user to which the flagged item is assigned may be able to reassign it such that an appropriate or other user may address the flagged item. In one non-limiting example, If using the "?Q1" notation described above, a response of the form "?Q2 Someone else handles port configuration, ?Chuck can you look at this?" may be used to reassign it to the correct user, here "Chuck." Similarly, an original flagged log element could be adjusted to show "?Kathy ->?Chuck" to show a reassignment from one user to another.

In some embodiments, systems and processes described herein may be used in a 24-hour support situation, wherein multiple people are working collaboratively over continuous periods of time, wherein users may be replaced by similarly trained persons. This may occur during shift changes, etc. In such situations, a "Transfer participation" option may be employed within various embodiments described herein. For example, with reference to FIG. 2, the menu 206d may include a "Transfer participation" option. When selecting such an option from the menu 206d, all flagged log elements assigned to the transferring user will be reassigned to the new or "replacement" user. Further, in some embodiments, the list of users 206b may indicate which specific user was replaced by which other specific user and/or when a specific user was replaced. In the example depicted in FIG. 2, Ryan is an active participant, and may have replaced Kathy; Kathy's name may be marked to indicate Kathy is no longer active, e.g., by greying out Kathy's name, or using some other indicator.

Although described above using the "?" notation for flagging, those of skill in the art will appreciate that any indicator may be used. For example, "@" may be used to direct a comment or question to a specific user. Further, combinations of flagging types may be used, such that "?" indicates a question and "@" indicates a comment to a specific user, etc.

Technical effects and benefits include a virtual application configured to enable collaborative work and real-time flagging of items therein, e.g., a collaborative effort system as described above. Further technical effects and benefits include providing flagging and tracking and managing such flagged items to a collaborative effort system (e.g., discussion, war room, chat room, instant messaging, emails, short message service elements, blog entries, website entries, online community entries, news feed items, wild entries, etc.) that may be used to selectively flag elements and/or content to be addressed by a specific user. Furthermore, technical effects and benefits include automatically tracking the flagged content such that a user may be able to address flagged content or items at a time later than when the item is generated.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to flag, track, and manage collaborative content to facilitate addressing flagged items, the method comprising:
    providing a user interface configured to receive a flag from a user for portions of content in a collaborative effort system, the content comprising one or more log elements and the flag indicating a flagged user;
    applying the flag to an indicated content to form a flagged content responsive to an input by the user;
    displaying the flagged content such that the flagged content is visible to the flagged user;
    receiving an entry by the flagged user indicating the flagged content; and
    removing the flag from the indicated content.

2. The method of claim 1, further comprising:
    tracking a time from when the flag is applied to the indicated content; and
    based on the tracked time exceeding a predetermined value without an entry received from the flagged user, sending a notification to the flagged user regarding the flagged content.

3. The method of claim 2, wherein the notification is at least one of an email, a text message, and a pop-up window displayed on the user interface.

4. The method of claim 2, wherein based on a response being made to the notification, the method further comprises integrating the response into the user interface.

5. The method of claim 1, wherein the flagged user is a user group.

6. The method of claim 1, further comprising:
    generating a user-specific list of a plurality of flagged content flagged for the flagged user.

7. The method of claim 6, wherein the user interface is configured to display the user-specific list, the method further comprising receiving a selection of a specific flagged content by the flagged user, and displaying the selected flagged content.

8. The method of claim 1, further comprising saving a plurality of flagged contents and automatically applying an index to the saved plurality of flagged contents.

9. The method of claim 1, further comprising:
    receiving input from the flagged user indicating the flagged content should be reassigned to a different user; and
    applying a new flag indicating a different flagged user to the flagged content.

10. The method of claim 9, further comprising:
    updating a user list indicating that the different user replaced the flagged user; and
    reassigning the flagged content to the new user.

11. A system to flag, track, and manage collaborative content to facilitate addressing flagged items, the system comprising:
    a memory having computer readable instructions; and
    a processor configured to execute the computer readable instructions, the computer readable instructions comprising:

providing a user interface configured to receive a flag from a user for portions of content in a collaborative effort system, the content comprising one or more log elements and the flag indicating a flagged user;

applying the flag to an indicated content to form a flagged content responsive to an input by the user;

displaying the flagged content such that the flagged content is visible to the flagged user;

receiving an entry by the flagged user indicating the flagged content; and removing the flag from the indicated content.

12. The system of claim 11, wherein the computer readable instructions further comprise:

tracking a time from when the flag is applied to the indicated content; and based on the tracked time exceeding a predetermined value without an entry received from the flagged user, sending a notification to the flagged user regarding the flagged content.

13. The system of claim 12, wherein the notification is at least one of an email, a text message, and a pop-up window displayed on the user interface.

14. The system of claim 13, wherein based on a response being made to the notification, the computer readable instructions further comprise integrating the response into the user interface.

15. The system of claim 11, wherein the flagged user is a user group.

16. The system of claim 11, wherein the computer readable instructions further comprise:

generating a user-specific list of a plurality of flagged content flagged for the flagged user.

17. The system of claim 11, wherein the user interface is configured to display the user-specific list, the computer readable instructions further comprise receiving a selection of a specific flagged content by the flagged user, and displaying the selected flagged content.

18. A computer program product to flag, track, and manage collaborative content to facilitate addressing flagged items, the computer program product comprising a computer readable storage medium having program instructions embodied therewith, the program instructions executable by a processor to cause the processor to:

provide a user interface configured to receive a flag from a user for portions of content in a collaborative effort system, the content comprising one or more log elements and the flag indicating a flagged user;

apply the flag to an indicated content to form a flagged content responsive to an input by the user;

display the flagged content such that the flagged content is visible to the flagged user;

receive an entry by the flagged user indicating the flagged content; and remove the flag from the indicated content.

19. The computer program product of claim 18, the program instructions executable by a processor further configured to cause the processor to:

track a time from when the flag is applied to the indicated content; and based on the tracked time exceeding a predetermined value without an entry received from the flagged user, send a notification to the flagged user regarding the flagged content.

20. The computer program product of claim 18, the program instructions executable by a processor further configured to cause the processor to:

generate a user-specific list of a plurality of flagged content flagged for the flagged user.

* * * * *